United States Patent

Ohashi

(10) Patent No.: US 10,795,031 B2
(45) Date of Patent: Oct. 6, 2020

(54) RADIATION DETECTION SYSTEM AND SIGNAL PROCESSOR FOR RADIATION DETECTION

(71) Applicant: HORIBA, Ltd., Kyoto-shi, Kyoto (JP)

(72) Inventor: Satoshi Ohashi, Kyoto (JP)

(73) Assignee: HORIBA, LTD., Kyoto (JP)

( * ) Notice: Subject to any disclaimer, the term of this patent is extended or adjusted under 35 U.S.C. 154(b) by 71 days.

(21) Appl. No.: 16/097,053

(22) PCT Filed: Apr. 11, 2017

(86) PCT No.: PCT/JP2017/014864
§ 371 (c)(1),
(2) Date: Oct. 26, 2018

(87) PCT Pub. No.: WO2017/187972
PCT Pub. Date: Nov. 2, 2017

(65) Prior Publication Data
US 2019/0154847 A1    May 23, 2019

(30) Foreign Application Priority Data
Apr. 28, 2016 (JP) .................. 2016-091716

(51) Int. Cl.
*G01T 1/17* (2006.01)
(52) U.S. Cl.
CPC ...................... *G01T 1/17* (2013.01)
(58) Field of Classification Search
CPC .................. G01T 1/17; G01T 1/24
See application file for complete search history.

(56) References Cited

U.S. PATENT DOCUMENTS 8,039,787 B2    10/2011    Mott

FOREIGN PATENT DOCUMENTS

| JP | 2008501954 A | 1/2008 |
|----|--------------|--------|
| JP | 2010169645 A | 8/2010 |

(Continued)

OTHER PUBLICATIONS

International Search Report dated Jul. 11, 2017 for PCT/JP2017/014864 and English translation.

(Continued)

*Primary Examiner* — Courtney D Thomas
(74) *Attorney, Agent, or Firm* — Lucas & Mercanti, LLP (57) ABSTRACT

The present invention is one that removes noise of a voltage signal to be inputted to a pulse processor 5, as well as improves radiation energy resolution, and includes: a radiation detector 2 that outputs charge generated by incidence of radiation; a preamplifier 3 that converts the generated charge into an analog signal; an A/D conversion part 4 that converts the analog signal from the preamplifier 3 into a digital signal; a denoising filter 5 that removes the noise from the digital signal from the A/D conversion part 4; a waveform shaping part 6 that generates a pulse signal from a digital signal having passed through the denoising filter 5; a pulse height detection part 7 that detects peak values of the pulse signal from the waveform shaping part 6; and a count part 8 that, on a pulse height basis, counts the peak values obtained by the pulse height detection part 7, in which the denoising filter 5 is one that removes the noise by taking the weighted moving average of values of the digital signal with use of a weighting factor depending on the difference from a predetermined reference value.

11 Claims, 8 Drawing Sheets

(56) References Cited

FOREIGN PATENT DOCUMENTS

| JP | 2013186109 A | 9/2013 |
|---|---|---|
| JP | 2014219362 A | 11/2014 |
| KR | 2015-0120205 A | 10/2015 |
| WO | 1994028438 A1 | 12/1994 |
| WO | 2005121988 A2 | 12/2005 |

OTHER PUBLICATIONS

EPO, Extended European Search Report for the corresponding European Patent Application No. EP17789259.3, dated Nov. 13, 2019 (7 pages).

RADIATION DETECTION SYSTEM AND SIGNAL PROCESSOR FOR RADIATION DETECTION

CROSS REFERENCE TO RELATED APPLICATION

This Application is a 371 of PCT/JP2017/014864 filed on Apr. 11, 2017 which, in turn, claimed the priority of Japanese Patent Application No. 2016-091716 filed on Apr. 28, 2016, both applications are incorporated herein by reference.

TECHNICAL FIELD

The present invention relates to a radiation detection system and a signal processor used for the radiation detection system.

BACKGROUND ART

As disclosed in Patent Literature 1, a conventional radiation detection system is configured to convert the integrated amount of charge outputted from a radiation detection part having a semiconductor radiation detecting element such as an SDD (Silicon Drift Detector) into an integrated signal (e.g., a voltage signal) corresponding to the integrated amount of current by a conversion part such as a CSA (Charge Sensitive Amplifier), and input it to a pulse processor such as a DPP (Digital Pulse Processor). The pulse processor shapes the integrated signal to a pulse signal having, for example, a trapezoidal waveform. The peak value of the pulse signal corresponds to the energy of radiation. In addition, a radiation spectrum can be obtained by counting the pulse signal on a pulse height basis using a counter such as an MCA (Multi Channel Analyzer).

Note that when the pulse signal resulting from the shaping by the pulse processor exhibits a quicker rise and fall (i.e., when the filter time constant PT of the pulse processor is shorter), radiations incident at random time intervals can be detected without fail.

For this reason, the pulse processor in Patent Literature 1 is configured to mount therein multiple waveform shaping filters having different filter time constants PT. Specifically, the pulse processor includes: a fast filter having a shorter filter time constant and mainly intended to detect radiation incidence; and a slow filter having a longer filter time constant and mainly intended to measure radiation energy. In addition, the slow filter is considered to have the shortest possible filter time constant PT so that pulse signals generated by incidence of different beams of radiation can be prevented from being excluded as a pile-up.

CITATION LIST

Patent Literature

[Patent Literature 1]
Japanese Unexamined Patent Publication JP-A2014-219362

SUMMARY OF INVENTION

Technical Problem

However, because of the filter characteristics of the pulse processor, if the filter time constant of the slow filter is made shorter than a certain value, the effect of white noise increases to fail to obtain sufficient S/N, and variations in measured energy values by the counter such as an MCA occur, thus deteriorating the energy resolution of an X-ray spectrum.

In addition, in order to remove the white noise, it is also conceivable to use a simple moving average filter; however, even a step part due to X-ray incidence is smoothed to dull the signal, and therefore it is difficult to obtain an accurate energy value.

Further, in the case of the fast filter, in order to distinguish pulsed noise due to the white noise and a pulse signal caused by X-ray incidence to obtain sufficient S/N, it is conceivable to increase the filter time constant PT. However, although a threshold value can be decreased by increasing the filter time constant PT to increase S/N, time resolution is deteriorated. In contrast, when decreasing the filter time constant PT, S/N decreases to improve the time resolution, but the threshold value must be increased (trade-off).

Therefore, the present invention has been made in order to solve the above-described problems at once, and a main object thereof is to reduce white noise to improve radiation energy resolution, as well as to improve pulse detection time resolution.

Solution to Problem

That is, a radiation detection system according to the present invention includes: a radiation detector that outputs charge generated by incidence of radiation; a preamplifier that converts the generated charge into an analog signal; an A/D conversion part that converts the analog signal from the preamplifier into a digital signal; a waveform shaping part that generates a pulse signal from the digital signal from the A/D conversion part; a pulse height detection part that detects peak values of the pulse signal from the waveform shaping part; a count part that, on the peak values basis obtained by the pulse height detection part, counts how many times the pulse signal from the pulse height detection part; and a denoising filter that is provided between the A/D conversion part and the pulse height detection part and removes noise from the digital signal or the pulse signal, in which the denoising filter is one that removes the noise by taking the weighted moving average of the values of the digital signal or the pulse signal with use of a weighting factor depending on the difference from a predetermined reference value.

Here, it is desirable that the waveform shaping part includes: a slow waveform output part that generates a pulse signal having long duration; and a fast waveform output part that generates a pulse signal having short duration.

In this radiation detection system, since the denoising filter provided in the stage prior to the pulse height detection part takes the weighted moving average of the values of the digital signal or the pulse signal with use of the weighting factor depending on the difference from the predetermined reference value, the noise of the digital signal to be inputted to the waveform shaping part or the noise of the pulse signal to be inputted to the pulse height detection part can be removed. Specifically, the noise can be removed while smoothing step parts of the digital signal to be inputted to the slow waveform output part to suppress dulling, and radiation energy resolution can be improved. Also, even when decreasing a filter time constant PT of the slow waveform output part, the energy resolution can be suppressed from deteriorating, and therefore the probability of a pile-up can be reduced to increase a counting rate while keeping the energy resolution. Further, a filter time constant PT of the fast waveform output part can be more decreased, and also a pulse detection threshold value can be reduced to a lower energy side, so that together with an improvement in pulse detection time resolution and an improvement in pile-up detection performance, pulse detection can be performed in a lower energy region by the fast waveform output part.

Also, a radiation detection system according to the present invention includes: a radiation detector that outputs charge generated by incidence of radiation; a preamplifier that converts the generated charge into an analog signal; an A/D conversion part that converts the analog signal from the preamplifier into a digital signal; a denoising filter that removes noise from the digital signal from the A/D conversion part; and a gradient detection part that detects a step-based gradient from a digital signal having passed through the denoising filter, in which the denoising filter is one that removes the noise by taking the weighted moving average of the values of the digital signal with use of a weighting factor depending on the difference from a predetermined reference value.

In this radiation detection system, the denoising filter provided in the stage prior to the gradient detection part takes the weighted moving average of the values of the digital signal with use of the weighting factor depending on the difference from the predetermined reference value, thus making it easy to determine the rise of a step part due to the incidence of radiation in the gradient detection part, so that from the slope (gradient) of the rise, the incident position of the radiation in the radiation detector can be estimated, and a pile-up caused by the incidence of multiple beams of radiation can be detected.

Specifically, it is desirable that the reference value is one that changes for each interval in the weighted moving average.

It is desirable that the denoising filter is configured to decrease the weighting factor as the difference from the reference value increases. Here, to be configured to decrease the weighting factor as the difference from the reference value increases includes a monotonic decrease in the weighting factor depending on the difference from the reference value, or a stepwise decrease in the weighting factor depending on the difference from the reference value, i.e., includes one including a constant part in which the weighting factor does not change.

When the digital signal is a voltage signal, the denoising filter takes the weighted moving average of voltage values $v(t)$ using a weighting factor $w(t)$ depending on $v(t)-v(t_0)$ for the voltage values $v(t)=v(t_0-n\Delta t)\sim v(t_0+n\Delta t)$ at time $t_0-n\Delta t \leq t < t_0+n\Delta t$ in dependence on a reference value $v(t_0)$ at time $t=t_0$.

In addition to the weighted moving average in the voltage direction as described above, the denoising filter desirably takes a weighted moving average in the time direction as well in terms of the accuracy of removing noise. That is, the denoising filter is desirably one that takes the weighted moving average of the values of the digital signal with use of a weighting factor depending on the time difference from a time point corresponding to the reference value. That is, the denoising filter takes the weighted moving average of the voltage values $v(t)$ with use of a weighting factor $w'$ depending on $|t-t_0|$ in the time direction.

It is desirable that the denoising filter is configured to decrease the weighting factor as the time difference from the time point corresponding to the reference value increases. Here, to be configured to decrease the weighting factor as the time difference from the time point corresponding to the reference value increases includes a monotonic decrease in the weighting factor depending on the time difference or a stepwise decrease in the weighting factor depending on the time difference, i.e., includes one including a constant part in which the weighting factor does not change.

As the above-described weighting factor $w(t)$ or weighting factor $w'(t)$, a weighting factor exhibiting Gaussian characteristics in dependence on the difference from the reference value or from the time point corresponding to the reference value is conceivable. By using the weighting factor exhibiting the Gaussian characteristics as described, a signal after the noise removal can be more smoothed. In addition, as such a weighting factor $w(t)$ or weighting factor $w'(t)$, a weighting factor formed in a rectangular shape (0/1 weighting) in the voltage direction or the time direction is also conceivable. By using the weighting factor formed in the rectangular shape as described, signal processing can be simplified. Besides, as the factor $w(t)$ or the factor $w'(t)$, a weighting factor inversely proportional (monotonic decrease) to the difference from the reference value or from the time point corresponding to the reference value is also possible.

Under the conditions that the denoising filter includes a digital signal processing device (digital circuit) such as an FPGA, ASIC, or DSP and a pipeline process is performed in real time, due to restrictions of logic resources and processing speed of such a digital circuit, it is realistic to set the factor $w(t)$ or the factor $w'(t)$ to the weighting factor formed in a rectangular shape (0/1 weighting) in the voltage direction or the time direction.

As a specific embodiment of the fast waveform output part, a fast waveform output part having a filter time constant PT of 50 ns or less and a pulse detection threshold value of 400 eV or less is conceivable. Also, a slow waveform output part having a filter time constant PT of 100 ns or less and a pulse detection threshold value of 200 eV or less is conceivable.

In addition, in order to reduce the effect of noise on both the fast waveform output part and the slow waveform output part, it is desirable that a filter threshold value of the denoising filter is set to be larger than the pulse detection threshold value of the fast waveform output part and the pulse detection threshold value of the slow waveform output part. Even when the filter threshold value of the denoising filter is set to be larger (twice or more) than the pulse detection threshold value of the fast waveform output part and the pulse detection threshold value of the slow waveform output part as described, X-ray pulses equivalent to or less than the filter threshold value of the denoising filter can be detected, and a filtering effect can be maximized.

Further, a signal processor for radiation detection of the present invention includes: a preamplifier that converts charge outputted from a radiation detector on which radiation is incident into an analog signal; an A/D conversion part that converts the analog signal from the preamplifier into a digital signal; a waveform shaping part that generates a pulse signal from the digital signal from the A/D conversion part; a pulse height detection part that detects peak values of the pulse signal from the waveform shaping part; a count part that, on the peak values basis obtained by the pulse height detection part, counts how many times the pulse signal from the pulse height detection part;

and a denoising filter that is provided between the A/D conversion part and the pulse height detection part and removes noise from the digital signal or the pulse signal, in which the denoising filter is one that removes the noise by taking the weighted moving average of the values of the digital signal or the pulse signal with use of a weighting factor depending on the difference from a predetermined reference value.

In addition, a signal processor for radiation detection of the present invention includes: a preamplifier that converts charge outputted from a radiation detector on which radiation is incident into an analog signal; an A/D conversion part that converts the analog signal from the preamplifier into a digital signal; a denoising filter that removes noise from the digital signal from the A/D conversion part; and a gradient detection part that detects a step-based gradient from a digital signal having passed through the denoising filter, in which the denoising filter is one that removes the noise by taking the weighted moving average of values of the digital signal with use of a weighting factor depending on the difference from a predetermined reference value.

Advantageous Effects of Invention

According to the present invention configured as described above, since the denoising filter provided in the stage prior to the waveform shaping part takes the weighted moving average of the values of the digital signal or pulse signal with use of the weighting factor depending on the difference from the predetermined reference value, the noise of the voltage signal to be inputted to a pulse processor can be removed. As a result, radiation energy resolution can be improved, and also pulse detection time resolution can be improved.

REFERENCE SIGNS LIST

100 X-ray detection system
2 X-ray detector
3 Preamplifier
4 A/D conversion part
5 Denoising filter
6 Waveform shaping part
61 Slow waveform output part
62 Fast waveform output part
7 Pulse height detection part
8 Count part

DESCRIPTION OF EMBODIMENTS

In the following, an X-ray detector as one embodiment of the radiation detection system according to the present invention will be described with reference to the drawings.

Figure 1:
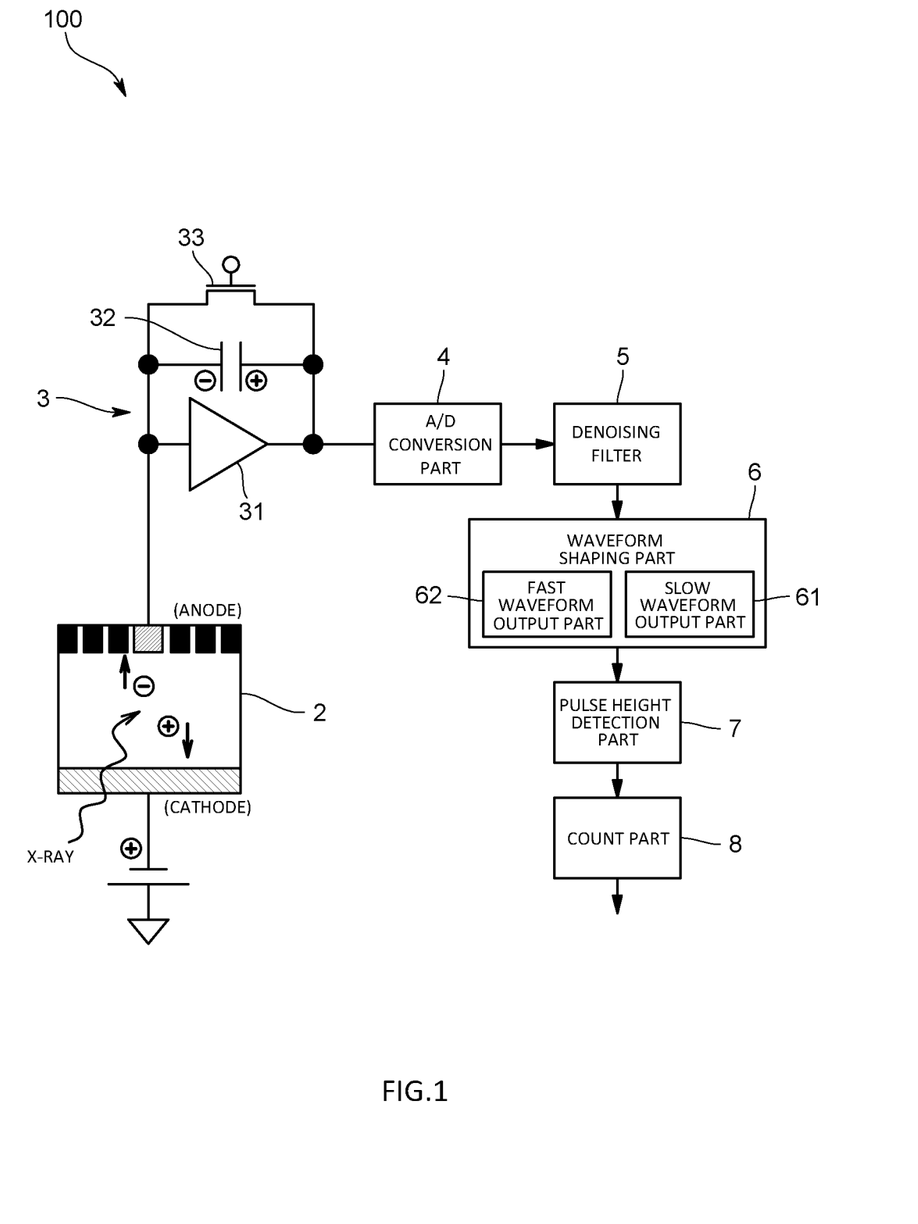
FIG. 1 is a schematic diagram illustrating a configuration of an X-ray detection system in the present embodiment.

As illustrated in FIG. 1, the X-ray detection system 100 of the present embodiment includes: an X-ray detector 2 that outputs charge generated by the incidence of an X-ray; a preamplifier 3 that converts the integrated amount of the charge outputted from the X-ray detector 2 into a voltage signal as an analog integrated signal corresponding to the integrated amount; an A/D conversion part 4 that converts the analog voltage signal from the preamplifier 3 to a digital voltage signal; a denoising filter 5 that removes noise from the digital voltage signal from the A/D conversion part 4; a waveform shaping part 6 that generates a pulse signal from a digital voltage signal having passed through the denoising filter 5; a pulse height detection part 7 that detects the peak values of the pulse signal from the waveform shaping part 6; and a count part 8 that, on a pulse height basis, counts the peak values obtained by the pulse height detection part 7.

The X-ray detector 2 is a silicon drift detector (SDD). In addition, the silicon drift detector is one that, using a concentric electrode structure, makes a collection on a central collecting electrode. Further, in the silicon drift detector, an incident X-ray is absorbed by a depletion layer, and electron-hole pairs whose number is proportional to the energy of the incident X-ray are generated in the depletion layer. The generated electrons flow to the collecting electrode (anode) along a potential gradient in the silicon drift detector. This allows the silicon drift detector to output charge proportional to the energy of the incident X-ray.

The preamplifier 3 is a charge sensitive amplifier (CSA), and one that integrates and amplifies the charge outputted from the X-ray detector 2 using an operational amplifier 31 and a capacitor 32 and converts to a voltage signal (analog signal) proportional to the energy of the X-ray. The preamplifier 3 has: the operational amplifier 31; the capacitor 32 connected between the input terminal (inverting input terminal) and output terminal of the operational amplifier 31; and a switch 33 such as a semiconductor switch (e.g. FET) for resetting (discharging) charge of the capacitor 32.

The denoising filter 5 is one that removes white noise included in the digital voltage signal from the A/D conversion part 4. In addition, the specific configuration of the denoising filter 5 will be described later.

The waveform shaping part 6 and the pulse height detection part 7 are configured to include a digital pulse processor (DPP). The waveform shaping part 6 generates the pulse signal having, for example, a trapezoidal waveform from the digital signal from the A/D conversion part 4. In addition, the peak value of the pulse signal is proportional to the energy of an X-ray.

Further, the waveform shaping part 6 in the present embodiment includes a slow waveform output part 61 and a fast waveform output part 62.

The slow waveform output part 61 is one that has high resolution with respect to the energy of an X-ray, and by filtering the digital voltage signal from the A/D conversion part 4 using a large filter time constant PT, generates a pulse signal having a trapezoidal waveform with long duration. Further, the pulse signal having long duration obtained by the slow waveform output part 61 is outputted to the pulse height detection part 7 and the count part 8, and used to generate X-ray information.

In addition, for the slow waveform output part, a filter time constant of 0.5 to 4 μs is usually most suitable in order to obtain sufficient energy resolution (this value depends on the characteristics and additional capacitances of SDD, and CSA or the preamplifier). Also, in consideration of the dulling of a shaped waveform due to a signal rise, a holding time HT of few tens to few hundreds ns is provided so as to obtain the pulsed waveform of a trapezoidal shape whose top is flat (the most suitable value of HT depends on the characteristics of SDD). In doing so, by taking the difference between a flat part average value and a baseline average value, a pulse peak value proportional to the energy of an incident X-ray is obtained, and a more accurate energy value than using a pulse signal from the fast waveform output part is obtained; however, the total process time (2PT+HT) becomes longer than the fast waveform output part, and if multiple X-rays are incident during the period, trapezoidal waves are superposed to fail to accurately obtain the peak value of each trapezoidal wave.

In addition, the fast waveform output part 62 is one that has high resolution with respect to detecting the incidence of an X-ray and by filtering the digital voltage signal from the A/D conversion part 4 using a smaller time constant PT than the slow waveform output part 61, generates a pulse signal (timing pulse) having short duration. In addition, the pulse signal having short duration obtained by the fast waveform output part 62 is used for the detection of a pile-up, or the like.

Further, the pulse height detection part 7 detects the peak values of an inputted pulse signal by peak hold. Specifically, the pulse height detection part 7 detects, from the pulse signal from the slow waveform output part 61 of the waveform shaping part 6, peak values except for ones subjected to the pile-up detection by the fast waveform output part 62.

The count part 8 is a multichannel analyzer (MCA). The count part 8 counts, on a pulse height basis, how many times the pulse height of a pulse signal is inputted, and generates an X-ray spectrum as the X-ray information.

In addition, the denoising filter (WMAF) 5 in the present embodiment removes noise by taking the weighted moving average of the values of the digital voltage signal from the A/D conversion part 4 using a weighting factor depending on the difference from a predetermined reference value.

Specifically, in dependence on a reference value $v(t_0)$ at time $t=t_0$, the denoising filter 5 uses a weighting factor w(t) depending on $v(t)-v(t_0)$ for voltage values $v(t)=v(t_0-n\Delta t)\sim v(t_0+n\Delta t)$ at time $t_0-n\Delta t \le t < t_0+n\Delta t$ to take the weighted moving average of the voltage values v(t). In addition, under the conditions that the denoising filter 5 includes a digital signal processor (digital circuit) such as an FPGA, ASIC, or DSP a pipeline process is performed in real time, and due to restrictions of logic resources and processing speed, a weighting factor having a rectangular shape (0/1 weighting) in the voltage direction is used.

In more detail, when the difference between the value v(t) of the digital voltage signal from the A/D conversion part 4 and the reference value v(t0) is larger than a filter threshold value TH, the denoising filter 5 sets the weighting factor w(t) for the value of the voltage signal to zero. Also, when the difference between the value v(t) of the digital voltage signal from the A/D conversion part 4 and the predetermined reference value v(t0) is equal to or smaller than the filter threshold value TH, the denoising filter 5 sets the weighting factor w(t) for the value of the voltage signal to one. In the present embodiment, the following operation is performed.

$$f(t) = \sum_{k=-(FL/2-1)}^{FL/2} w(t,k) \cdot d(t+k) / \sum_{k=-(FL/2-1)}^{FL/2} w(t,k),$$ [Expression 1]

$$w(t,k) = \begin{cases} 1 & (|d(t+k)-d(t)| \le TH) \\ 0 & (|d(t+k)-d(t)| > TH) \end{cases}$$

Here, d(t) represents the value (voltage value) of the voltage signal at time t, FL a filter length in the time direction, and TH the filter threshold value in the voltage direction.

Also, w(t, k) represents a weighting function at time t and at a point separated from d(t) by k(−(FL/2−1)≤k≤FL/2), and when d(t+k) and d(t) are separated by the filter threshold value TH or more, w(t, k)=0, thus excluding a value d(t+k) at the time from the moving average process.

Figure 2:
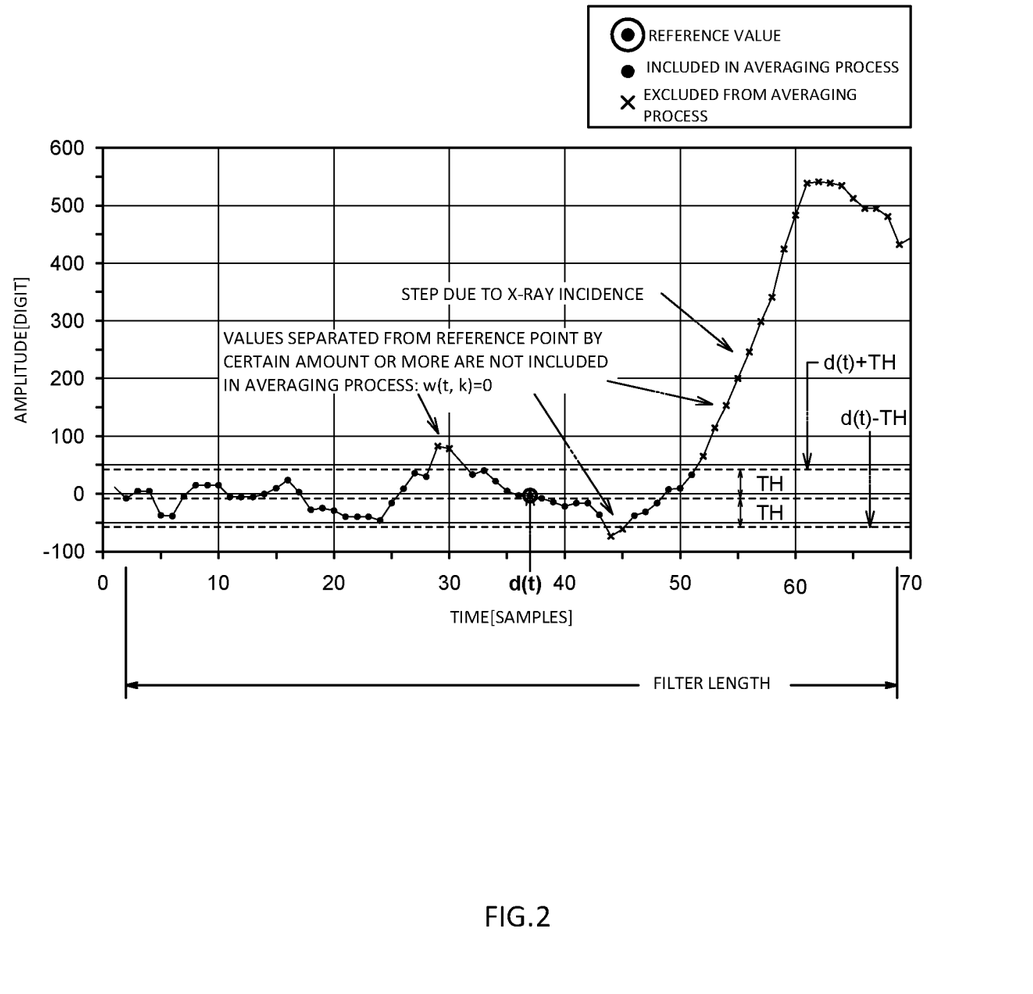
FIG. 2 is a diagram explaining a weighted moving average in the same embodiment.

By performing this process, as illustrated in FIG. 2, points (x marks in FIG. 2) separated from the reference value d(t) by the threshold value TH or more are excluded from the moving average process, and points (black circle marks in FIG. 2) within a range of plus/minus threshold value TH from the reference value d(t) are moving-averaged together with the reference value. The moving average obtained in this manner is a value f(t) at time t. In doing so, in regions other than step parts, where changes are small, a smoothing effect is obtained, and in the step parts where changes are large, a filter input value (here, d(t)) almost directly passes to hold the edges of steps.

This operation does not require a multiplier for the calculation of w(t, k), but can be performed only with a comparator. Since w(t, k) is zero or one, the operation does not also require a multiplier for d(t+k) in the numerator, but can be perform with a logic product (AND) operator or a multiplexer for the bit width of d(t+k). In addition, the denominator can also be calculated only by counting the number of one bits among comparator outputs for w(t, k) described above, thus eliminating the need for multiplier or a product-sum operation and enabling the calculation only using several stages of bit shift operations and adders. Since the resulting count value is an integer from 1 to FL, by preliminarily calculating and storing in BRAM as a lookup table the inverses of them, an inverse can be obtained without a divider by calling the inverse with the count value as an address. By respectively pipelining and then parallelizing the derivation of the inverse of the denominator and the derivation of the numerator and finally multiplying both, the filter passing signal f(t) can be obtained. In such a circuit configuration, a circuit scale is not so large, and parallelization and pipelining can be sufficiently performed, so that an FPGA having scale and performance typically employed for DPP can sufficiently perform the operation using surplus resources after implementation of DPP, and operation speed is also the same speed (100 MHz) as DPP, enabling a real-time process.

Figure 3:
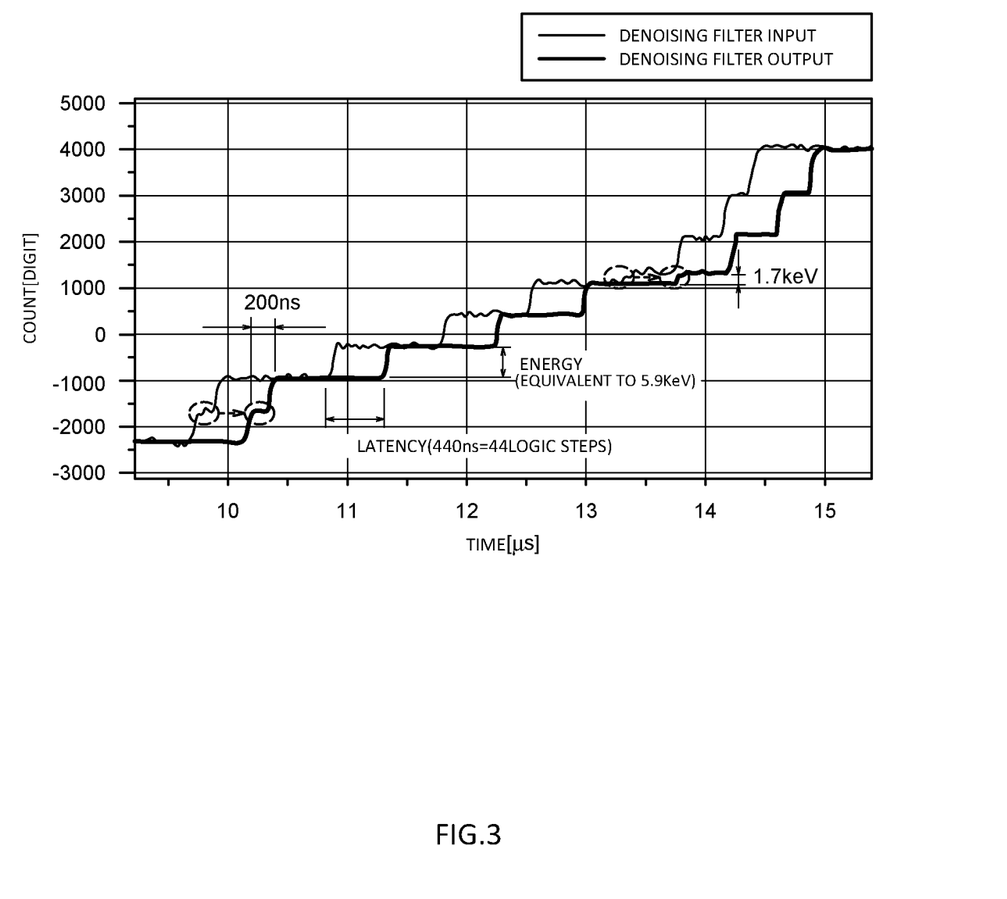
FIG. 3 is a diagram illustrating a voltage waveform before input to a denoising filter and a voltage waveform after output in the same embodiment.

A voltage waveform before input to the denoising filter 5 and a voltage waveform after output from the denoising filter 5 are illustrated in FIG. 3.

It turns out from FIG. 3 that as compared with the input voltage of the denoising filter 5, in the output voltage of the denoising filter 5, a noise component is significantly reduced, and the output is provided without dulling voltage step parts caused by X-ray incidences. In particular, the boundary between two steps near 9.8 μs in the voltage waveform before the input is not clear; however, in a part (near 10.3 μs) corresponding to it in the voltage waveform after the output, the two steps are clearly separated, and a resolution of FL or less is obtained in the time direction. Also, near 13.2 μs in the voltage waveform before the input, it is difficult to recognize a clear step; however, in a part (near 13.6 μs) corresponding to it in the voltage waveform after the output, a clear step can be reproduced.

From this result, it turns out that the denoising filter 5 in the present embodiment enables resolution to be improved in both the time direction and the energy direction.

Figure 4:
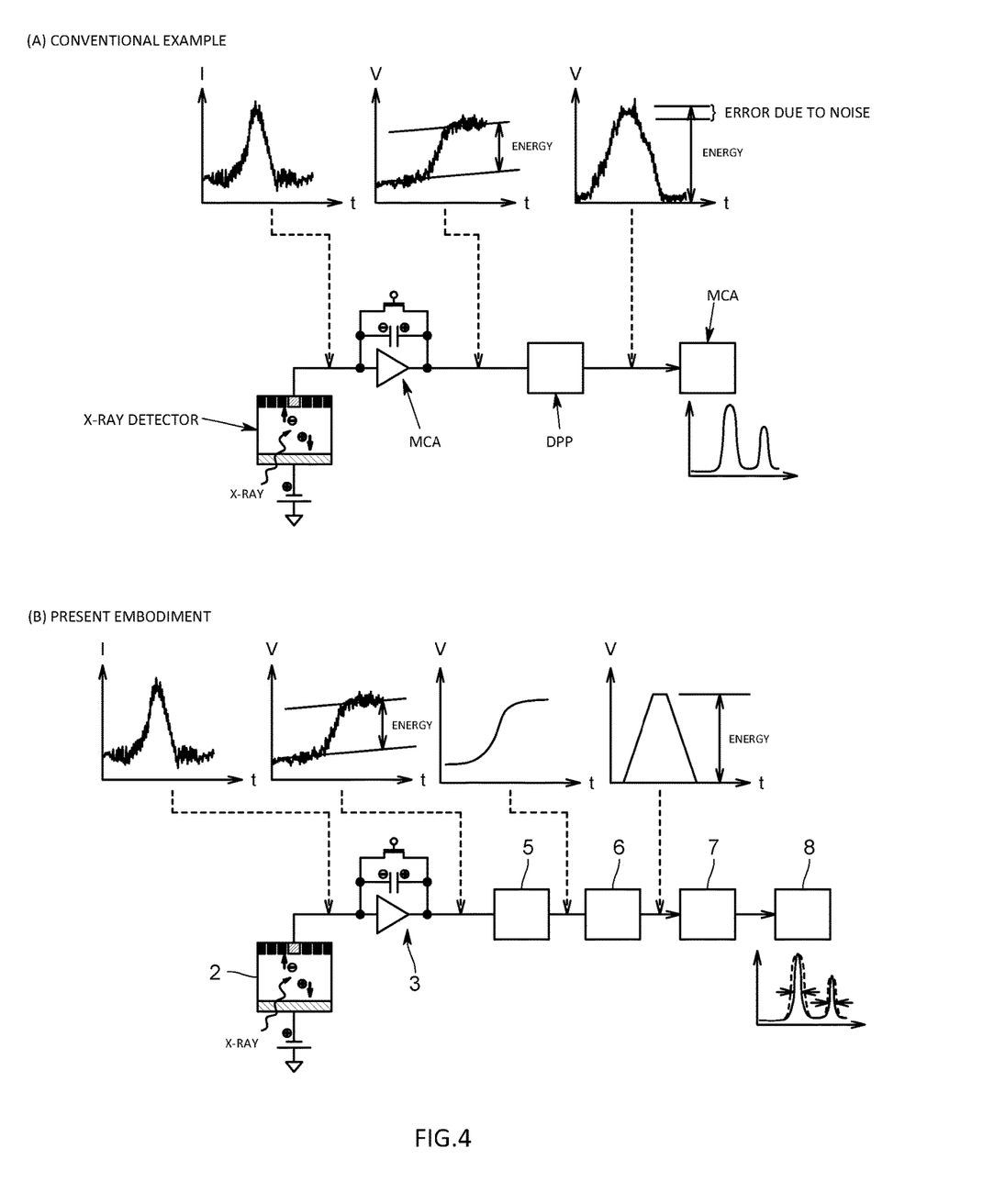
FIG. 4 is a diagram illustrating signal waveforms at respective parts of an X-ray detection system in a conventional example and signal waveforms at respective part of the X-ray detection system in the present embodiment.

FIG. 4(A) schematically illustrates signal waveforms at respective points in an X-ray detection system having no denoising filter 5 (conventional example), and (B) of the same drawing schematically illustrates signal waveforms at respective points in the X-ray detection system having the denoising filter 5 (present embodiment).

Figure 5:
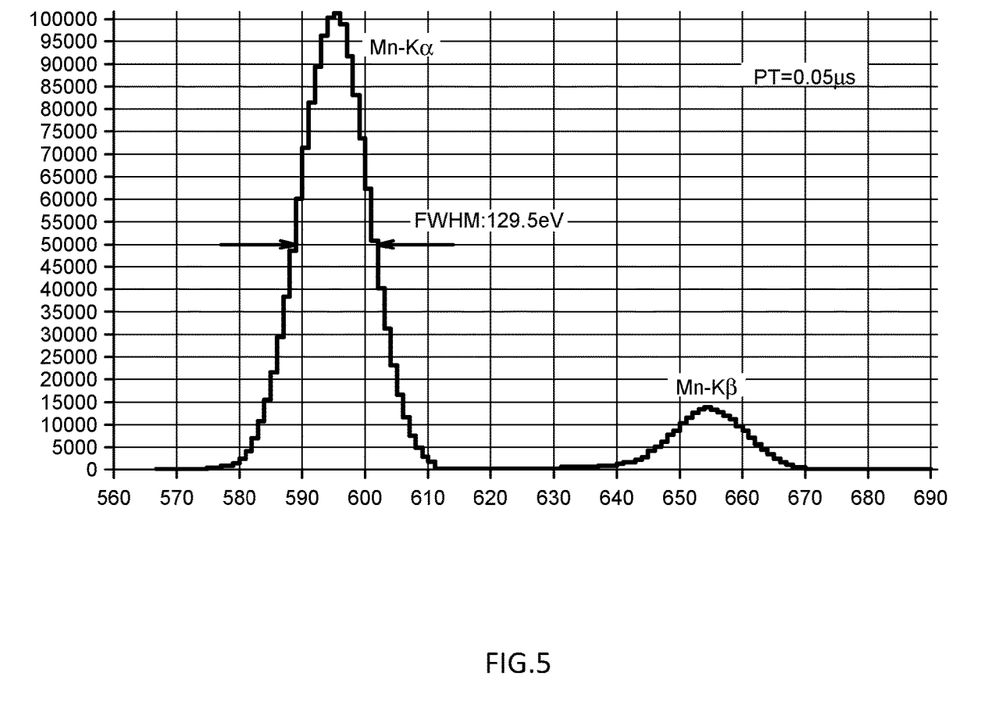
FIG. 5 is a diagram illustrating the result of a spectrum measurement test by an X-ray fluorescence analyzer equipped with the X-ray detection system in the same embodiment.

Next, the result of a spectrum measurement test by an X-ray fluorescence analyzer (MESA-50 manufactured by HORIBA, Ltd.) equipped with the X-ray detection system 100 of the present embodiment is shown.

In the spectrum measurement test, the measurement was performed using Mn as a sample under the conditions of an X-ray tube voltage of 15 kV, a tube current of 50 μA, an irradiation diameter φ of 3 mm, a niobium (Nb) filter, and an SDD cooling temperature of −15° C.

FIG. 5 illustrates the result of the measurement test. FIG. 5 is a spectrum when the filter time constant PT of a pulse processor (slow waveform output part 61) is 50 ns, and the horizontal axis corresponds to 10 eV per channel. In this spectrum, when the denoising filter 5 is used together with a short filter time constant of PT=50 ns, the Gaussian shape of the spectrum is hardly lost.

Figure 6:
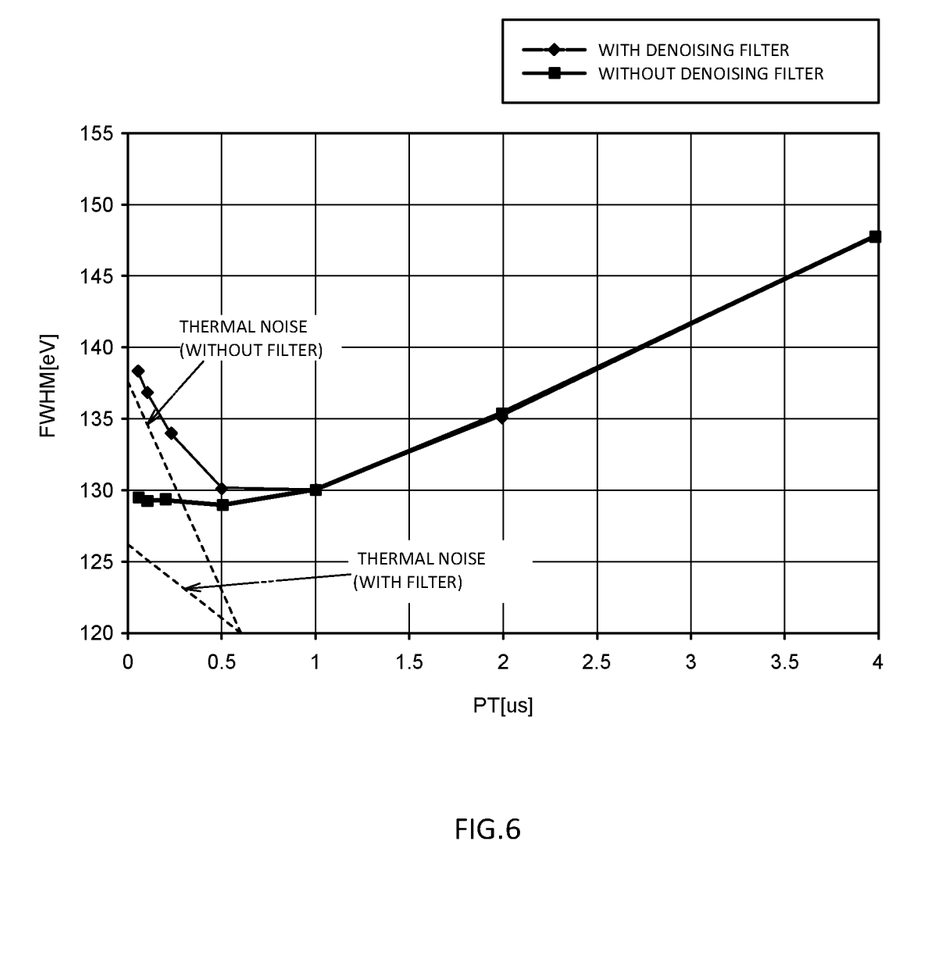
FIG. 6 is a diagram illustrating the energy resolution of a Mn-Kα spectrum at each PT in the presence or absence of the denoising filter in the same embodiment.

Also, FIG. 6 illustrates the energy resolution (full width at half maximum (FWHM)) of a Mn-Kα spectrum at each filter time constant PT in the presence or absence of the denoising filter 5.

It turns out from FIG. 6 that in a region where the filter time constant PT is 0.5 μs or less, significant improvement in FWHM is seen, and that the white noise component is greatly reduced. From this result, it turns out that in the region where the filter time constant PT is short, the denoising filter 5 is effective in improving the energy resolution.

In the X-ray detection system 100 of the present embodiment configured as described, the denoising filter 5 provided in the stage prior to the waveform shaping part 6 takes the weighted moving average of the values of the digital voltage signal using a weighting factor w(t, k) depending on the difference from the predetermined reference value v(t), and therefore the noise of the digital voltage signal to be inputted to the waveform shaping part 6 can be removed.

Specifically, the noise can be removed while smoothing the step parts of the digital voltage signal to be inputted to the slow waveform output part 61 and preventing dulling, and the X-ray energy resolution can be improved.

Also, since even when decreasing the filter time constant PT (e.g., 0.1 μs) of the slow waveform output part 61, sufficient energy resolution is obtained, a process time by the slow waveform output part 61 can be more shortened to reduce the probability of the incidence of multiple X-rays within the process time, thus reducing the occurrence of a pile-up.

Further, since the filter time constant PT of the fast waveform output part 62 can be more decreased, and also the pulse detection threshold value can be reduced to the lower energy side, even in the case of incidence of lower energy X-rays, closely incident X-rays can be separated. As a result, together with an improvement in pulse detection time resolution and an improvement in pile-up detection performance, pulse detection can be performed in the lower energy region by the fast waveform output part 62. For example, even in the case of a light element having 1 keV or less, pile-up detection can be performed at the best time resolution. That is, even when the filter time constant PT is set to 10 ns and the pulse detection threshold value is set to 400 eV or less, noise is not erroneously detected.

Note that the present invention is not limited to the above-described embodiment.

For example, the above-described embodiment is one using the rectangular-shaped weighting factor (0 or 1) depending on the value of the digital voltage signal; however, the following one is also possible. For example, a weighting factor exhibiting Gaussian characteristics is also possible depending on the difference from the reference value or a weighting factor inversely proportional (monotonic decrease) to the difference from the reference value is also possible. In addition, although the weighting factor is basically decreased with distance from the reference value in the voltage direction, it is not simply decreased, but may be constant or partially increased.

Further, the denoising filter 5 may be one adapted to take the weighted moving average also in the time direction in addition to the weighted moving average in the voltage direction. That is, the denoising filter 5 takes the weighted moving average of the values of the digital voltage signal using a weighting factor w'(t) depending on the time difference from the time point $t_0$ corresponding to the reference value $v(t_0)$. Specifically, the denoising filter 5 takes the weighted moving average of the voltage values v(t) using the weighting factor w'(t) depending on $|t-t_0|$ in the time direction. Here, the denoising filter 5 is desirably configured so that as the difference from the time point to corresponding to the reference value $v(t_0)$ increases, the weighting factor w'(t) decreases. It is conceivable that the weighting factor w'(t) is set in the same manner as the weighting factor w(t) in the voltage direction.

Further, in addition to the configuration of the above-described embodiment, a configuration adapted to provide a bypass path that bypasses the denoising filter 5, and be switchable between path through which the digital voltage signal reaches the waveform shaping part 6 from the A/D conversion part 4 via the denoising filter 5 and a path through which the digital voltage signal reaches the waveform shaping part 6 from the A/D conversion part 4 without denoising filter 5 is also possible. Still further, a configuration having multiple denoising filters 5 is also possible, and a configuration adapted to serially arrange filters having different parameters such as filter threshold values and filter intervals (filter lengths) or to parallel arrange them and make a switch is also possible. In addition, the slow waveform output part 61 and the fast waveform output part 62 may be respectively provided with denoising filters.

In the above-described embodiment, the denoising filter 5 is provided between the A/D conversion part 4 and the waveform shaping part 6, but not limited to this. For example, the waveform shaping part 6 may be provided with the denoising filter 5 to remove noise simultaneously with waveform shaping or to remove noise after waveform shaping. In addition, the denoising filter 5 may be provided between the waveform shaping part 6 and the pulse height detection part 7 to remove noise of a pulse signal outputted from the waveform shaping part 6.

Besides the above-described embodiment, a signal processor for radiation detection of the present invention may be one having none of the waveform shaping part, pulse height detection part, and count part. In this case, separately from the signal processor, an information processor having the waveform shaping part, pulse height detection part, and count part is provide. Specifically, this signal processor for radiation detection is one including: a preamplifier that converts charge outputted from a radiation detector on which radiation is incident into an analog signal; an A/D conversion part that converts the analog signal from the preamplifier into a digital signal; and a denoising filter that removes noise from the digital signal from the A/D conversion part, in which the denoising filter removes the noise by taking the weighted moving average of values of the digital signal using a weighting factor depending on the difference from a predetermined reference value.

Further, as the X-ray detector, another semiconductor detector such as a Si (Li) type detector can be used, or other than semiconductor is also possible, such as a proportional counter tube or a photomultiplier tube. Besides, in addition to the X-ray detection, detection of other radiation such as y-rays is also applicable. Also, the radiation detector may be of a type that a light detector detects light resulting from conversion by a scintillator or the like.

Figure 7:
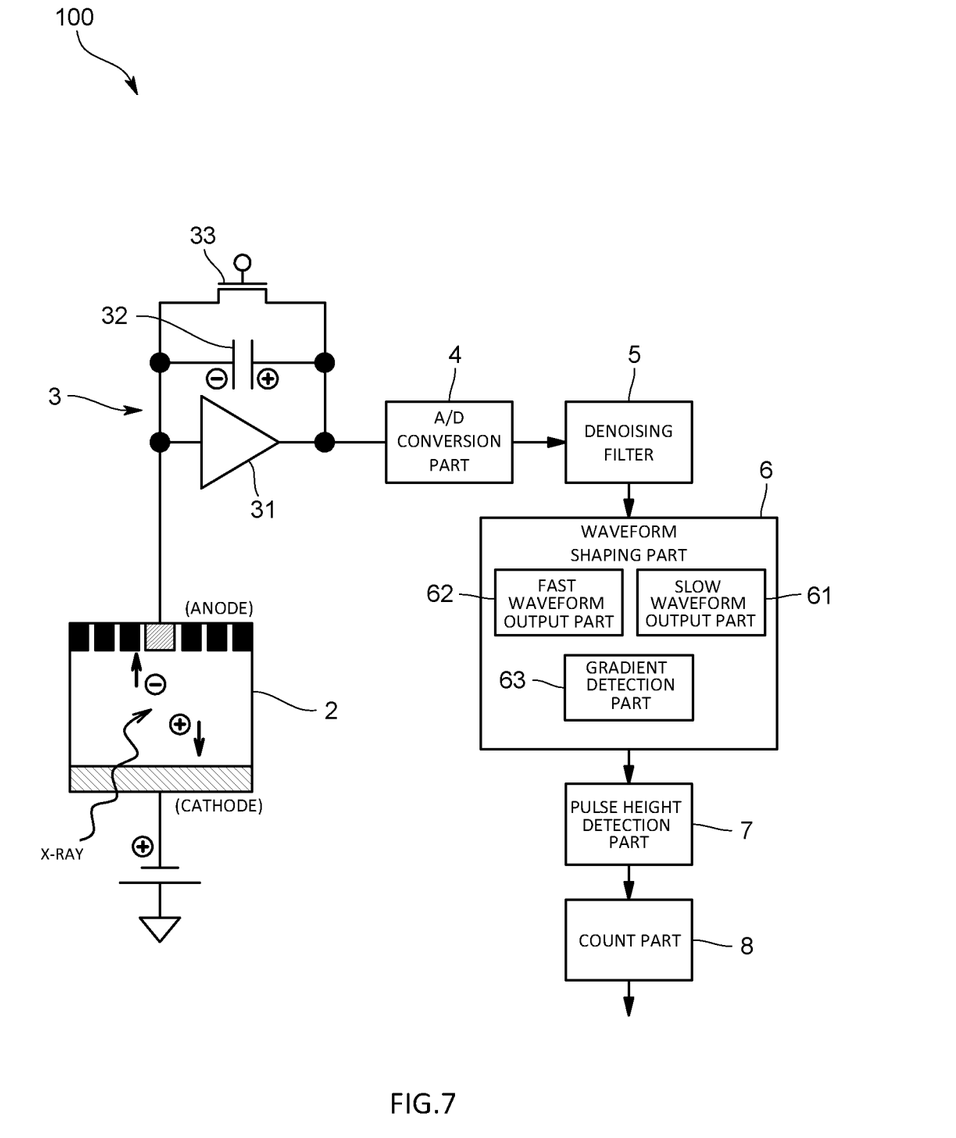
FIG. 7 is a schematic diagram illustrating a configuration of an X-ray detection system in a variation.

In addition, as illustrated in FIG. 7, the X-ray detection system 100 may be one including a gradient detection part 63 that detects a step-based gradient from a digital voltage signal having passed through a denoising filter 5. The function of the denoising filter 5 is the same as in the above-described embodiment.

The gradient detection part 63 is provided separately from a slow waveform output part 61 and a fast waveform output part 62, and configured to include a digital pulse processor (DPP). The gradient detection part 63 is a filter that performs waveform shaping to decrease voltages other than at steps to base voltage while keeping the gradients of step parts of the digital voltage signal.

In this X-ray detection system 100, the denoising filter 5 provided in the stage prior to the gradient detection part 63 takes the weighted moving average of the values of the digital voltage signal using a weighting factor depending on the difference from a predetermined reference value, thus making it easy to determine the rise of a step part due to the incidence of an X-ray in the gradient detection part 63, so that from the slope (gradient) of the rise, the incident position of the X-ray in an X-ray detector 2 can be estimated, and a pile-up caused by the incidence of multiple X-rays can be detected.

Figure 8:
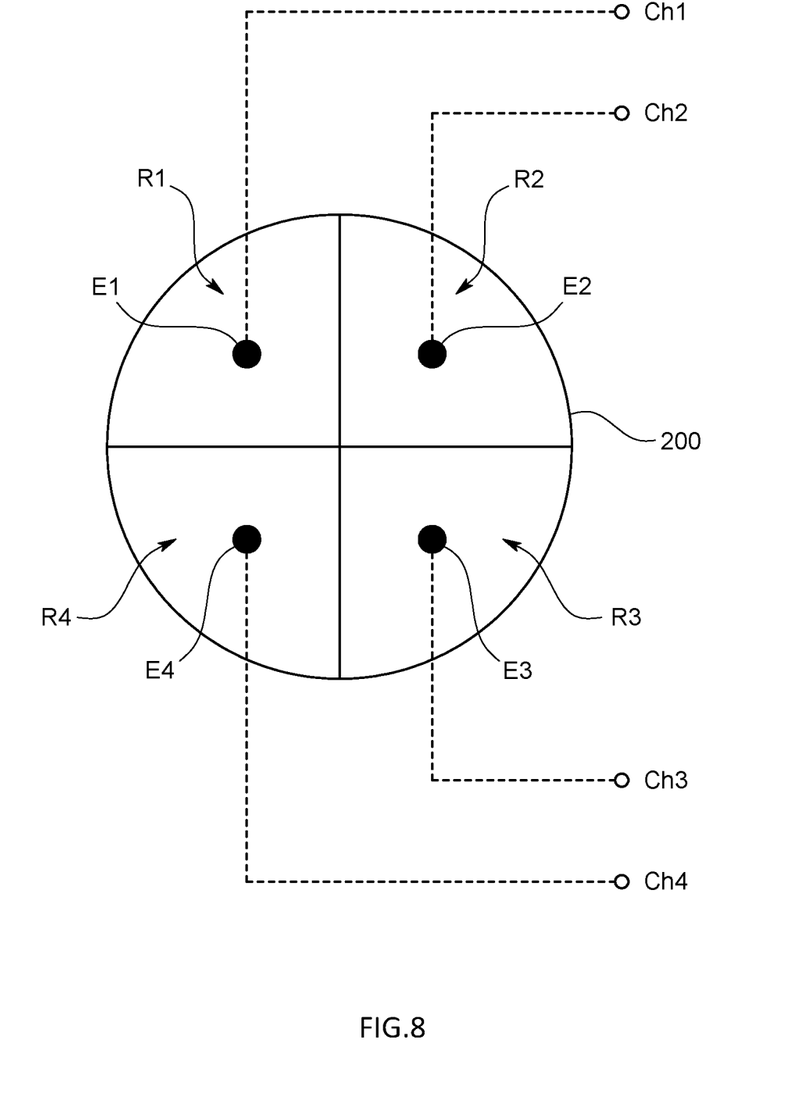
FIG. 8 is a schematic diagram illustrating a variation of a silicon drift detector.

In addition, the silicon drift detector in the above-described embodiment may be one in which as illustrated in FIG. 8, an X-ray detection area is divided into more than one, and each area is provided with a collecting electrode (anode).

In this configuration, when an X-ray is incident on the boundary between respective areas, generated electrons may be dispersed and collected by multiple collecting electrodes, causing an overlap count. For this reason, a signal generated by an X-ray incident on the boundary between respective areas is desirably removed so as to prevent counting.

Also, at the boundary, the strength of an electric field is weak, and a distance to a collecting electrode is long, so that it takes time for generated electrons to be collected by a collecting electrode. As a result, a detection signal caused by electrons generated at the boundary exhibits a slower change in signal value with respect to time than a detection signal caused by electrons generated in an area other than it.

By using such characteristics, the stage subsequent to the denoising filter 5, for example, the pulse processor (such as the gradient detection part 63) may be configured to determine whether the slope of a voltage signal is a predetermined value or less, and when it is equal to or less than the predetermined value, remove the voltage signal on the assumption that the voltage signal is caused by an X-ray incident on a boundary. Since the voltage signal whose noise has been removed by the denoising filter 5 is used to determine whether or not the slope thereof is predetermined value or less, the determination can be accurately made.

Besides, it goes without saying that the present invention is not limited to the above-described embodiments, but can be variously modified without departing from the scope thereof.

INDUSTRIAL APPLICABILITY

According to the present invention, the radiation detection system is capable of reducing white noise to improve radiation energy resolution, as well as improve pulse detection time resolution.

The invention claimed is:

1. A radiation detection system comprising:
a radiation detector that outputs charge generated by incidence of radiation;
a preamplifier that converts the generated charge into an analog signal;
an A/D conversion part that converts the analog signal from the preamplifier into a digital signal;
a waveform shaping part that generates a pulse signal from the digital signal from the A/D conversion part;
a pulse height detection part that detects a peak value of the pulse signal from the waveform shaping part;
a count part that, on the peak value basis obtained by the pulse height detection part, counts how many times a pulse height of the pulse signal is inputted to the count part from the pulse height detection part; and
a denoising filter that is provided between the A/D conversion part and the pulse height detection part and removes noise from the digital signal or the pulse signal, wherein
the denoising filter is one that removes the noise by taking a weighted moving average of values of the digital signal or the pulse signal with use of a weighting factor depending on a difference from a predetermined reference value.

2. The radiation detection system according to claim 1, wherein
the denoising filter is configured to decrease the weighting factor as the difference from the reference value increases.

3. The radiation detection system according to claim 1, wherein
the weighting factor is one exhibiting a Gaussian characteristic or one formed in a rectangular shape in dependence on the difference from the reference value.

4. The radiation detection system according to claim 1, wherein
the denoising filter is one that takes the weighted moving average of the values of the digital signal or the pulse signal with use of a weighting factor depending on a time difference from a time point corresponding to the reference value.

5. The radiation detection system according to claim 4, wherein
the denoising filter is configured to decrease the weighting factor as the time difference from the time point corresponding to the reference value increases.

6. The radiation detection system according to claim 4, wherein the weighting factor is one exhibiting a Gaussian characteristic or one formed in a rectangular shape in dependence on a difference from the time point corresponding to the reference value.

7. The radiation detection system according to claim 1, wherein
the waveform shaping part includes: a slow waveform output part that generates a pulse signal having long duration; and a fast waveform output part that generates a pulse signal having short duration.

8. The radiation detection system according to claim 1, wherein
the reference value is one that changes for each interval in the weighted moving average.

9. A radiation detection system comprising:
a radiation detector that outputs charge generated by incidence of radiation;
a preamplifier that converts the generated charge into an analog signal;
an A/D conversion part that converts the analog signal from the preamplifier into a digital signal;
a denoising filter that removes noise from the digital signal from the A/D conversion part; and
a gradient detection part that detects a step-based gradient from a digital signal having passed through the denoising filter, wherein
the denoising filter is one that removes the noise by taking a weighted moving average of values of the digital signal with use of a weighting factor depending on a difference from a predetermined reference value.

10. A signal processor for radiation detection, the signal processor comprising:
a preamplifier that converts charge outputted from a radiation detector on which radiation is incident into an analog signal;
an A/D conversion part that converts the analog signal from the preamplifier into a digital signal;
a waveform shaping part that generates a pulse signal from the digital signal from the A/D conversion part;
a pulse height detection part that detects a peak value of the pulse signal from the waveform shaping part;
a count part that, on the peak value basis obtained by the pulse height detection part, counts how many times a pulse height of the pulse signal is inputted to the count part from the pulse height detection part; and
a denoising filter that is provided between the A/D conversion part and the pulse height detection part and removes noise from the digital signal or the pulse signal, wherein
the denoising filter is one that removes the noise by taking a weighted moving average of values of the digital signal or the pulse signal with use of a weighting factor depending on a difference from a predetermined reference value.

11. A signal processor for radiation detection, the signal processor comprising:
a preamplifier that converts charge outputted from a radiation detector on which radiation is incident into an analog signal;
an A/D conversion part that converts the analog signal from the preamplifier into a digital signal;
a denoising filter that removes noise from the digital signal from the A/D conversion part; and
a gradient detection part that detects a step-based gradient from a digital signal having passed through the denoising filter, wherein
the denoising filter is one that removes the noise by taking a weighted moving average of values of the digital signal with use of a weighting factor depending on a difference from a predetermined reference value.

* * * * *